United States Patent [19]
Brehmer et al.

[11] Patent Number: 5,232,006
[45] Date of Patent: Aug. 3, 1993

[54] SYSTEM FOR SEPARATING GAS FROM A LIQUID FLOW WHOSE VOLUME IS TO BE MEASURED

[75] Inventors: Roland Brehmer, Fellingsbro; Kurt Eriksson, Riddarhyttan, both of Sweden

[73] Assignees: F. Wennstrom Aktiebolag, Kungsor; Isofront Aktiebolag, Riddarhyttan, both of Sweden

[21] Appl. No.: 800,930

[22] Filed: Dec. 4, 1991

[30] Foreign Application Priority Data

Dec. 7, 1990 [SE] Sweden ................. 9003898

[51] Int. Cl.$^5$ .............................................. F16T 1/00
[52] U.S. Cl. ............................................... 137/183
[58] Field of Search ................. 137/173, 174, 183; 73/200, 19.1; 324/694, 698

[56] References Cited

U.S. PATENT DOCUMENTS

| | | | |
|---|---|---|---|
| 2,552,088 | 5/1951 | Davis | 324/698 X |
| 3,040,573 | 6/1962 | Berck | 73/200 |
| 4,266,188 | 5/1981 | Thompson | 324/696 X |
| 4,543,191 | 9/1985 | Stewart | 324/696 X |

FOREIGN PATENT DOCUMENTS

| | | |
|---|---|---|
| 0357513A | 3/1990 | European Pat. Off. |
| 0394100 | 10/1990 | European Pat. Off. |
| 1473186A | 2/1970 | Fed. Rep. of Germany |
| 2282111 | 3/1976 | France |
| 2149143 | 6/1985 | United Kingdom |

*Primary Examiner*—Robert G. Nilson
*Attorney, Agent, or Firm*—Keck, Mahin & Cate

[57] ABSTRACT

A system for separating gas from a liquid flow whose volume is to be measured with the exclusion of gas inclusions comprises a liquid conduit (5) through which the liquid flow is conducted. The conduit (5) incorporates a volume meter (5), a fluid homogeneity meter (20, 21) arranged upstream of the volume meter, a closure valve (6; 60) and a gas discharge conduit (7; 71) connected to the liquid conduit. The fluid homogeneity meter is constructed to hold the valve (6; 60) in its valve setting in which the liquid conduit (5) is open when the difference between the gas contents of the liquid detected at different time points is lower than a predetermined limit value, and to close the valve (6; 60) when these difference values are not beneath the limit value. The arrangement can be used, for instance, with a system for emptying oil products from a tank in a petroleum tanker. The fluid homogeneity meter may include a pair of electrodes (210, 211) which are mounted in the liquid conduit (5), in which case the meter (20, 21) will detect the capacitance formed by the electrodes and the liquid/or gas present therebetween, and compare the difference between the detected capacitance values with the limit value.

8 Claims, 1 Drawing Sheet

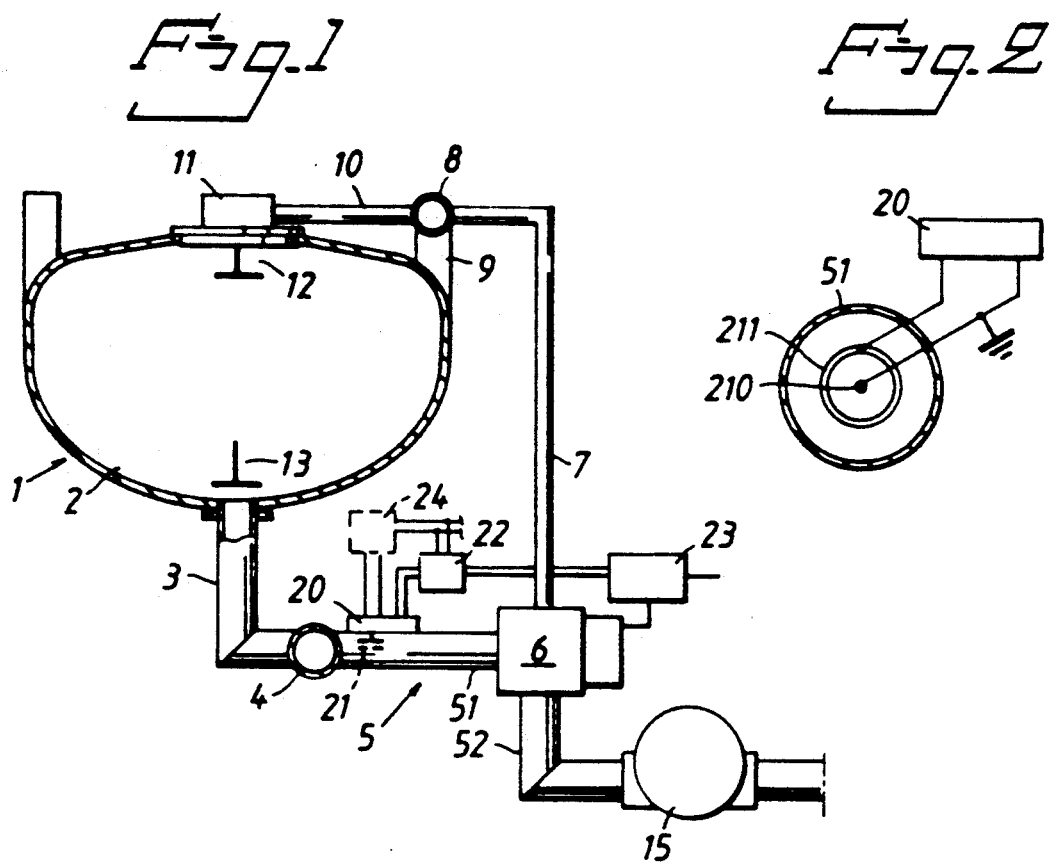
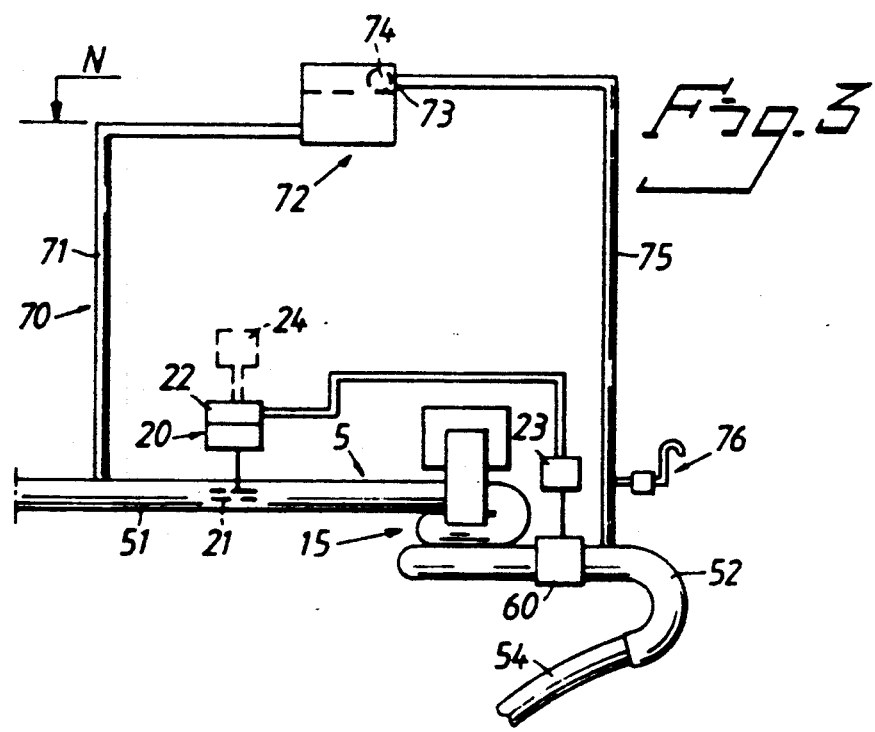

SYSTEM FOR SEPARATING GAS FROM A LIQUID FLOW WHOSE VOLUME IS TO BE MEASURED

The present invention relates to a system for separating a gas from a flow of liquid whose volume is to be measured, said system being of the kind defined in the preamble of the following claim 1.

The system is intended particularly, but not exclusively, for measuring the volumetric flow of petroleum products and oil products discharged from the petroleum tanks of petroleum trucks or petroleum-truck trailers.

The problem of extracting air and gas from oil or petroleum delivered from petroleum trucks prior to the oil or petroleum flowing through the delivery volume meter has long been known. The rising prices of oil products has caused many customers to ask whether they are actually receiving the quantity of liquid in a delivery for which they are charged, particularly when the liquid product is offloaded with the aid of gravitational, self-pouring systems. Gas and air are liable to be entrained with the liquid flow during an offloading operation, and gases that have dissolved in the product are liable to be released and enter the flow of product passing through the measuring system used. This system will measure the volume of the flow that passes through the system, instead of measuring the net volume of the liquid.

In order to overcome this problem, it is known to extract air and gas from the product flow, before the air passes through the volume meter. Known gas separators, however, are complex and therewith expensive, and must be shut down over long periods during an offloading operation, due to the difficulty in determining a requisite gas discharge time for instance, or must be adjusted and reset for different liquids, or require separate, additional operations at the end of an offloading operation.

DE-A-1 473 186 teaches an system of this kind which comprises a centrifuge chamber in which there is established a vortex which has a vertical axis, whereby gases are extracted from the product flow and collected at the top of the vortex chamber, from where they can be lead away. In order to enable this centrifuge extractor to work correctly and efficiently, so as to prevent gas in the bottom part of the vortex from accompanying the liquid outflow from the gas separator, it is necessary to provide the separator with a bottom sump. Upon completion of the offloading operation, a considerable quantity of the liquid product will remain in the sump, which constitutes an obvious disadvantage when switching from one liquid product to another, i.e. when switching between leaded petroleum, non-leaded petroleum, oil, different qualities of oil, etc., and makes cleaning of the system difficult.

Gas is detected in the fuel flow by means of a pair of electrodes positioned, for instance, in an upper part of the gas separator, immediately beneath the level of its liquid inlet. When fuel, i.e. oil or the like is present between the electrodes, it is possible to measure a given capacitance over the electrodes, and a fuel flow valve is held open when the capcitance exceeds a given limit value which indicates that fuel devoid of any gas enclosures is present between the electrodes. In this case, there is used the fact that different liquid fuels, such as petroleum, oil, paraffin, etc. have essentially the same dielectric constant, so as to enable the system to be used with different types of fuel without needing to reset the system. The dielectric constant of the detected fuel volume, however, will change radically when air or gas bubbles are mixed with the fuel present between the electrodes, such that the measured capacitance will change radically and exceed the limit value. This causes a flow cut-off valve to close, so as to prevent fuel containing gas bubbles from flowing through the volume meter which is located downstream of the gas separator. Gas that has been separated in the separator is collected in the upper part thereof and is emptied therefrom by activating a gas release valve, either manually or automatically, for instance over the same period of time as that over which the flow valve is kept closed.

Consequently, a further problem lies in the impossibility of emptying the separator chamber automatically through the fuel flow valve when the level of liquid has reached the electrodes, since the limit value of the capacitance is then passed and the flow valve is held closed for as long as gas is present between the electrodes.

A further problem is that the limit value of the system must be reset for liquids of mutually different dielectric constants.

An object of the present invention is to provide an system of the kind defined in the preamble of claim 1, particularly for use with petroleum trucks or petroleum-truck trailers, which will eliminate or reduce one or more of the aforesaid drawbacks.

This object is achieved with an system constructed in accordance with the following claim 1.

Further embodiments of the system are defined in the depending claims.

The liquid conducting conduits and devices are completely devoid of liquid slope down so that they can be emptied completely through a self-pouring action, i.e. gravitationally. In addition to this, a central feature of the inventive system is that the fluid homogeneity meter does not detect the instantaneous value of the homogeneity and compare this value with a limit value, but instead measures the difference between the homogeneity values at different points in time, and compares this difference with a limit value. Consequently, the system is not only generally independent of the dielectric constant of the liquid, but additionally the flow conduits are emptied automatically upon completion of an offloading operation, without needing to take any additional measures. The reason for this is that if the liquid level reaches a position between the electrodes at the end of an offloading operation, the detected homogeneity will certainly change radically, thereby causing the flow valve to close, but after a short period of time the liquid level will lie stable between the electrodes and the homogeneity difference will be measured as substantially zero and the flow valve open so that liquid is able to flow out, etc., and when the liquid level has gradually reached a position beneath the electrodes, essentially only gas will be located between the electrodes and the detected capacitance will remain equal at different measuring occasions, so as to hold the flow valve open and enabling the liquid residues to flow from the conduit.

The invention will now be described in more detail with trated in the accompanying drawings.

FIG. 1 illustrates schematically an inventive arrangement installed in the tank of a petroleum truck;

FIG. 2 illustrates schematically an electrode arrangement in the fluid homogeneity meter forming part of the arrangement; and FIG. 3 illustrates schematically an alternative embodiment of the inventive arrangement which can be installed in the tank of a petroleum truck.

Illustrated in FIG. 1 is a tank 1 of a petroleum truck or a petroleum-truck trailer. The tank includes several compartments 2, of which one is shown in FIG. 1, and a discharge conduit 3 fitted with a valve 13 is mounted on the bottom of said compartment. The conduits 3 of respective compartments are connected together by means of a connecting conduit 4 extending along the tank. Provided at the top of each compartment 2 is a valve 12 and a pipe connector provided with a cover or lid and being intended for connection to a conduit 10. The conduit 10 discharges into a conduit 8 which extends along the length of the tanker, and a wall or coaming 9 extends between the upper part of the compartment 2 and the conduit 8.

A liquid discharge conduit 5 extends from the connecting conduit 4 to a through-flow type volumetric flow meter 15 which measures the volume of the liquid flowing therethrough. The meter is preferably a rotor-type meter. Although not shown, the arrangement may include a liquid pump.

The conduit 5 incorporates a two-way valve 6 which in a first positional setting connects that section of the conduit which is located upstream of the valve 6 to that section 52 of the conduit 5 which is located downstream of the valve 6, this latter section 52 discharging into the meter 15. In its second positional setting, the valve 6 blocks the flow to the conduit section 52 and guides the flow from the conduit 51 to a riser-conduit 7, which extends up to a level which is at least equal to the highest liquid level in the compartment 2. The riser conduit 7 is suitably connected to the distribution conduit 8, so as to return gas separated from drained liquid to the upper part of the compartment 2. The conduit 7 thus forms a degassing conduit which carries away gas bubbles in the liquid when the flow of liquid is blocked by the valve 6.

Mounted in the conduit section 51 is a pair of electrodes 21 belonging to a fluid homogeneity meter 20 which, via a relay 22, controls a control valve 23 mounted in a pressurized-air conduit, said valve 23 activating the valve 6.

The electrode pair 21 forms a capacitance which is dependent on the dielectric constant of the material present between the electrodes. The meter 20 measures the capacitance at regular time intervals and compares the resultant values. When the difference between the values is substantially zero, this is an indication that the fluid between the electrodes is substantially homogenous, i.e. that the liquid is substantially free from gas bubbles. Provided that the meter 20 detects a homogenous fluid between the electrode pair, the valve 6 will hold the conduit sections 51, 52 connected to one another and also holds the riser conduit 7 closed. When the difference between the values detected by the meter 20 change significantly, however, the relay 22 is activated which, in turn, activates the control valve 23, which reverses the setting of the valve 6, so as to shut-off the flow of fluid through the conduit 51 from the conduit 52 and enable gas to depart through the riser conduit 7. When fitted, the pump is stopped at the same time. The level of the liquid in the compartment 2 reaches the level of the liquid in the riser conduit 7 and gas inclusions are able to rise up through the conduit 7 and pass to the upper part of the compartment 2. The gas content of the liquid present in the conduit 5 and the discharge conduit 3 rises through the liquid in the compartment 2 to the upper part of said compartment. The fluid homogeneity meter 20, 21 is constantly active and immediately the meter detects that the fluid between the pair of electrodes is homogenous, it activates the two-way valve 6, via the relay 22 and the control valve 23, so as to close-off the riser conduit 7 and to connect the conduit sections 51, 52 together, and to simultaneously activate a pump, when fitted. The meter 20 may, of course, be constructed to activate the two-way valve 6 and any pump fitted after a given, selected time delay.

A unit 24 for monitoring and activating the meter 20 may be installed in the driver's cabin of the truck.

When emptying of the liquid in a compartment 2 is completed, the liquid level in the conduit section 51 will fall so that liquid will solely partly fill the space between the electrode pair 21, and the meter 20 will reverse the setting of the valve 6 so that liquid present in the riser conduit 7 will run back to the conduit section 51. When the meter 21 again detects that the dielectric constant of the fluid between the electrode pair 21 remains steady, i.e. does not vary in time, the valve 6 is again switched so as to connect the conduit section 51 with the conduit section 52, thereby closing the empty riser conduit 7 and enabling the liquid in the conduits 3, 4 and 5 to run out to the meter 15, provided that these conduits are inclined downwardly towards the meter 15 along the whole of their respective lengths.

As will be understood from the aforegoing, the meter 20 is constructed to cause the two-way valve 6 to connect together the conduit sections 51, 52 and to close the riser conduit 7 when the dielectric constant of the fluid between the electrode pair 21 is constant or substantially constant at mutually sequential measuring occasions, and if not constant to switch the valve to its setting in which the conduit section 51 is connected to the riser conduit 7 while the conduit section 52 is closed.

It will be understood by the person skilled in this art, that a system which includes the conduit 5, including the meters 15 and 20 and the valve 6 and associated control devices 20–24 will form a system which can be installed in a petroleum tanker.

As illustrated in FIG. 2, the electrode pair 21 may suitably include a circular-cylindrical outer tube electrode 211 which extends parallel, e.g. coaxial with the conduit section 51, and an electrode 210 located coaxially therein. The inner electrode 211 is preferably connected to the conduit 5 and thereby earthed, as illustrated in FIG. 2, whereas the outer electrode 210 is connected directly to the meter 20, so as to form a measuring electrode.

The embodiments illustrated in FIG. 1 and FIG. 3 comprise a conduit 5 which incorporates a fluid homogeneity meter 20, 21, a volume meter 15, and a valve 60 which closes the conduit 5, and in which the conduit incorporating the meters and the closure valve slopes downwards in the liquid-emptying direction, such that the fluid will leave the conduit gravitationally.

The meter 20 controls the shut-off valve 60 in accordance with the same criteria as the meter 20 of the FIG. 1 embodiment controls the valve 6.

The embodiment illustrated in FIG. 3 includes a gas discharge conduit 70 which has an inlet section 71 connected to the conduit 5, upstream of the meter 20.

As distinct from the embodiment shown in FIG. 3, the gas discharge conduit 70 may extend back to the upper part of the tank, not shown. In the case of the preferred embodiment illustrated in FIG. 3, however, the inlet section 71 extends up to the marked level N, which lies a short distance above the highest liquid level in the tank, not shown, and connects thereto a float housing 72 having provided in the upper part thereof an outlet 73 which forms a seat for a float ball 74. The arrangement is such that the outlet of the float chamber 72 will be blocked when the float chamber 72 is filled with liquid. Connected to the outlet 73 is a conduit section 75 which discharges into the conduit 5 at the section 53 thereof located downstream of the valve 60.

A discharge pump may be connected to the conduit 5, for example upstream of the point at which the gas discharge conduit 71 is connected to the conduit 5.

As illustrated, the arrangement includes an intake suction valve 76 which is connected in the gas discharge section 75, immediately above the point at which said section is connected to the conduit section 52, for reasons explained below.

It will be understood by the person skilled in this art that when the valve 60 interrupts a powerful flow of liquid through the conduit 5, via a hose 54, down into a cistern, the liquid column interrupted at the valve 60 will continue to move and generate a subpressure on its upstream side. Under normal conditions, it is possible to eliminate this subpressure by sucking gas present in the gas conduit 70 into the conduit section 52, via the gas discharge section 75. If liquid is now sucked into the float valve and blocks said valve, ambient air can be sucked in via the subpressure valve 76, which opens when the pressure in the conduit 75 falls beneath atmospheric pressure.

Upon completion of a draining operation, when the conduit 5 begins to become empty of liquid, it is possible that a liquid column which moves down in the conduit section 52 and the hose 54 will suck air from the tank, not shown, via the conduit 5, and cause the volume meter 15 to operate. Because the gas discharge arrangement 70 shown in FIG. 3 has a lower flow resistance than the conduit 5 incorporating the homogeneity meter 20, the volume meter 15 and the open valve 60, such false volume recordings are prevented.

Although the inventive homogeneity meter has been described with reference to a capacitance measuring process by way of example, it will be understood that the homogeneity can be detected or measured in a corresponding manner by other methods, for instance optical methods or vibratory methods, although capacity measurements are preferred.

Although not shown in the drawings, the limit value against which the signal difference of the meter 20, 21 is compared may be controlled in accordance with a time plan which begins at a high limit value when the valve 6; 60 opens the conduit 5, and which value is then preferably decreased stages in accordance with a given function, for instance a time function.

According to one advantageous embodiment of the invention, the tubular, hollow electrode may have a diameter which is half the diameter of the surrounding conduit section, said tubular electrode preferably being coaxial with said section. In this embodiment, the occurrence of gas bubbles or the like is detected both in the flow of liquid through the tubular electrode and through the space between electrode and the surrounding conduit section, provided that the center electrode and the conduit section are held at mutually the same potential, preferably by connecting the same to earth. In this way, the capacitance between the tubular electrode and the conduit section and between the two electrodes respectively will be generally the same, provided that the material therebetween has the same dielectric constant.

We claim:

1. A system for separating gas from a liquid flow whose volume is to be measured, said flow passing through a liquid conduit (5) which incorporates a volume meter (15), a fluid homogeneity meter (20, 21) mounted upstream of the volume meter, a closure valve (6; 60) and a gas discharge conduit (7; 71) connected to the liquid conduit, wherein the fluid homogeneity meter (20, 21) is constructed to hold the valve (6; 60) in its liquid-conduit opening setting when the difference between the gas content of the liquid detected at different time points is lower than a predetermined limit value, and to switch the valve (6) to its closed position when said gas content is not lower than said predetermined limit value, wherein the liquid conduit (5) slopes down in the direction of liquid flow; and the meter and valves incorporated in the liquid conduit lack liquid traps so as to enable the liquid conduit to be completely emptied by gravitational flow.

2. A system for separating gas from a liquid flow whose volume is to be measured, said flow passing through a liquid conduit (5) which incorporates a volume meter (15), a fluid homogeneity meter (20, 21) mounted upstream of the volume meter, a closure valve (6; 60) and a gas discharge conduit (7; 71) connected to the liquid conduit, wherein the fluid homogeneity meter (20, 21) is constructed to hold the valve (6; 60) in its liquid-conduit opening setting when the difference between the gas content of the liquid detected at different time points is lower than a predetermined limit value, and to switch the valve (6) to its closed position when said gas content is not lower than said predetermined limit value, wherein the fluid homogeneity meter (20, 21) includes a pair of electrodes (210, 211) which are positioned in the liquid conduit (5), and wherein the fluid homogeneity meter (20, 21) detects the capacitance formed by the electrodes and the liquid and/or gas present therebetween at time-spaced intervals, and to compare the difference between the detected capacitance values with the limit value, wherein the electrode pair (21) includes an external hollow tubular electrode (211) which extends parallel with the axis of the liquid conduit, and a further electrode (210) which is mounted coaxially in the hollow, tubular electrode, and the radius of the outer electrode is preferably about half the radius of the surrounding conduit.

3. A system for separating gas from a liquid flow whose volume is to be measured, said flow passing through a liquid conduit (5) which incorporates a volume meter (15), a fluid homogeneity meter (20, 21) mounted upstream of the volume meter, a closure valve (6; 60) and a gas discharge conduit (7; 71) connected to the liquid conduit, wherein the fluid homogeneity meter (20, 21) is constructed to hold the valve (6; 60) in its liquid-conduit opening setting when the difference between the gas content of the liquid detected at different time points is lower than a predetermined limit value, and to switch the valve (6) to its closed position when said gas content is not lower than said predetermined limit value, wherein the gas discharge conduit (70) is connected to the liquid conduit (52) at a position downstream of the closure valve (60) and extends in an upwardly turned curve between the points of its connection to the liquid conduit.

4. A system according to claim 3, characterized in that a float valve (72-74) is arranged in the gas discharge conduit (71, 75) preferably at its highest point; and in that the float valve is intended to block the outlet of the conduit (71, 75) from a float valve chamber (72) when liquid reaches an level of the outlet (73).

5. A system for separating gas from a liquid flow whose volume is to be measured, said flow passing through a liquid conduit (5) which incorporates a volume meter (15), a fluid homogeneity meter (20, 21) mounted upstream of the volume meter, a closure valve (6; 60) and a gas discharge conduit (7; 71) connected to the liquid conduit, wherein the fluid homogeneity meter (20, 21) is constructed to hold the valve (6; 60) in its liquid-conduit opening setting when the difference between the gas content of the liquid detected at different time points is lower than a predetermined limit value, and to switch the valve (6) to its closed position when said gas content is not lower than said predetermined limit value, wherein the liquid-conduit closure valve (6) has the form of a two-way valve which when the valve closes the liquid conduit (5) against the volume meter (15), the liquid conduit section (51) located upstream of said two-way valve (6) is connected to the gas discharge conduit (7), which extends up to a level above the highest liquid level in a tank emptied by said liquid conduit, said gas discharge conduit (7) preferably connecting with the interior of the tank.

6. A system for separating gas from a liquid flow whose volume is to be measured, said flow passing through a liquid conduit (5) which incorporates a volume meter (15), a fluid homogeneity meter (20, 21) mounted upstream of the volume meter, a closure valve (6; 60) and a gas discharge conduit (7; 71) connected to the liquid conduit, wherein the fluid homogeneity meter (20, 21) is constructed to hold the valve (6; 60) in its liquid-conduit opening setting when the difference between the gas content of the liquid detected at different time points is lower than a predetermined limit value, and to switch the valve (6) to its closed position when said gas content is not lower than said predetermined limit value, and means for adapting the magnitude of the limit value to various stages of the emptying procedure of a liquid-carrying tank, wherein said means is constructed to initially produce, subsequent to commencement of liquid flow through the liquid conduit, a high limit value which permits the liquid valve (6; 60) to be initially held open at relatively large variations in homogeneity in time, and to then lower the limit value as the emptying procedure continues.

7. A system according to claim 6, characterized in that said means is preferably constructed to lower the limit value in stages as a function of the time taken to complete a tank emptying operation.

8. A system according to claim 6, characterized in that said means is constructed to reinstate a high limit value, preferably the highest limit value, subsequent to closing the closure valve (6; 60) of the liquid conduit.

* * * * *